United States Patent
Ting et al.

(10) Patent No.: US 7,956,595 B2
(45) Date of Patent: Jun. 7, 2011

(54) ADAPTIVE CONSTANT-VOLTAGE CONTROL CIRCUIT AND ADAPTIVE POWER CONVERTER CONTROLLER

(75) Inventors: Ming Chiang Ting, Hsinchu (TW); Chun-Te Chiang, Jhongli (TW)

(73) Assignee: Niko Semiconductor Co., Ltd., Taipei (TW)

( * ) Notice: Subject to any disclaimer, the term of this patent is extended or adjusted under 35 U.S.C. 154(b) by 115 days.

(21) Appl. No.: 12/432,123

(22) Filed: Apr. 29, 2009

(65) Prior Publication Data
US 2010/0277153 A1   Nov. 4, 2010

(51) Int. Cl.
*G05F 1/00* (2006.01)
(52) U.S. Cl. ......................................... 323/285; 323/369
(58) Field of Classification Search .................. 323/285, 323/283, 369
See application file for complete search history.

(56) References Cited

U.S. PATENT DOCUMENTS

| 5,777,462 A * | 7/1998 | Yue ................................ 323/285 |
| 7,279,878 B2 * | 10/2007 | Ootani et al. .................. 323/285 |
| 7,358,709 B2 * | 4/2008 | Itoh ............................... 323/273 |

* cited by examiner

*Primary Examiner* — Shawn Riley
(74) *Attorney, Agent, or Firm* — Kile Goekjian Reed & McManus PLLC

(57) ABSTRACT

An adaptive power converter controller coupled to a load and a power converter circuit is provided. The adaptive power converter controller has an adaptive voltage sensing unit and a converting control circuit. The adaptive voltage sensing unit is coupled to the load and output a voltage sensing signal according to a load current and a load voltage from the load. The converting control circuit is utilized for receiving the voltage sensing signal and comparing the voltage level of the voltage sensing signal with a current sensing signal, which is corresponding solely to the load current, so as to decide whether the power converter circuit is controlled according to the voltage sensing signal or the current sensing signal.

13 Claims, 8 Drawing Sheets

ADAPTIVE CONSTANT-VOLTAGE CONTROL CIRCUIT AND ADAPTIVE POWER CONVERTER CONTROLLER

BACKGROUND OF THE INVENTION

1. Field of the Invention

The present invention relates to a power converter controller, and more particularly relates to an adaptive power converter controller.

2. Description of Related Art

The technology of constant-voltage to constant-current transferring control is usually applied to Lithium battery chargers and current-limiting constant-voltage regulators. As to Lithium battery chargers, the charging process begins at constant-current mode to fast charging the battery. Then, as the voltage level of the battery reaches a predetermined limitation, the lithium battery chargers would be transformed into constant-voltage mode to clamp the voltage level of the battery to protect the battery. As to current-limiting constant-voltage regulators, the operation begins at constant-voltage mode to restrict the voltage level of output voltage. Then, as the output current reaches a predetermined limitation, the current-limiting constant-voltage regulator would be transformed into constant-current mode to clamp the output current so as to achieve the object of current-limiting protection.

FIG. 1 is a schematic view of a prior art constant-voltage to constant-current transferring controller 10. As shown, the constant-voltage to constant-current transferring controller 10 is electrically coupled to a power converter circuit 11, which is utilized for providing electrical power to a load 12. The constant-voltage to constant-current transferring controller 10 has a voltage sensing circuit 13, a current sensing circuit 14, a DC voltage level converting circuit 151, and an error amplifier 152. The voltage sensing circuit 13 detects the voltage level provided to the load 12 to output a voltage sensing signal VOS accordingly. The current sensing circuit 14 detects the current on the load 12 to output a current sensing signal VCS accordingly. The DC voltage level converting circuit 151 receives the current sensing signal VCS and adjusts the voltage level of the current sensing signal VCS according to a first reference voltage signal VR1 so as to output an adjusted current sensing signal VC1. The error amplifier 152 receives the voltage sensing signal VOS, the adjusted current sensing signal VC1, and a second reference voltage signal VR2 to output a feedback voltage signal VFB.

As the voltage level of the voltage sensing signal VOS over that of the adjusted current sensing signal VC1, the error amplifier 152 generates the feedback voltage signal VFB according to the voltage sensing signal VOS and the second reference voltage signal VR2. That is, the error amplifier 152 adopts voltage feedback control and the constant-voltage to constant-current transferring controller 10 is in constant-voltage mode. As the voltage level of the voltage sensing signal VOS under that of the adjusted current sensing signal VC1, the error amplifier 152 generates the feedback voltage signal VFB according to the adjusted current sensing signal VC1 and the second reference voltage signal VR2. That is, the error amplifier 152 adopts current feedback control and the constant-voltage to constant-current transferring controller 10 is in constant-current mode. Thereby, the object of constant-voltage to constant-current transferring control is achieved.

FIG. 2 is a diagram showing the relationship between output voltage and output current of the power converter circuit 11 by using the constant-voltage to constant-current transferring controller 10 in FIG. 1. As shown, in constant-voltage mode, as the output current close to the predetermined current limit under constant-current mode, the efficiency of constant-voltage feedback control under constant-voltage mode is disturbed by the operation of constant-current feedback control, which results in a reduction of output voltage level and an increasing of feedback error. Therefore, the characteristic of constant-voltage output of the constant-voltage to constant-current transferring controller 10 is influenced.

SUMMARY OF THE INVENTION

Accordingly, the present invention provides an adaptive power converter controller, which generates a voltage sensing signal by detecting the load voltage and the load current and compares the voltage sensing signal with a current sensing signal solely corresponding to the load current. The comparing result is utilized to decide whether the power converter control is based on the current sensing signal or the voltage sensing signal, so as to achieve the object of adaptive constant-voltage to constant-current transferring control.

To achieve the above mentioned object, an adaptive power converter controller is provided in the present invention. The adaptive power converter controller, which is electrically coupled to a load and a power converter circuit, has an adaptive voltage sensing unit and a converting control circuit. The adaptive voltage sensing unit generates a voltage sensing signal according to a load current and a load voltage from the load. The converting control circuit receives the above mentioned voltage sensing signal, compares the voltage sensing signal with a current sensing signal corresponding solely to the load current, and makes a decision of controlling the power converter circuit according to the current sensing signal or the voltage sensing signal.

In an embodiment of the present invention, the adaptive voltage sensing unit has a first resistor, a second resistor, and a third resistor. The three resistors compose a resistor string, which forms a circuit loop with the load. The resistor string has one end electrically connected to an output end of the power converter circuit and the other end electrically connected to a grounding end of the load. Sum of voltage levels crossing the second resistor and the third resistor represents the voltage sensing signal. Voltage level crossing the third resistor represents the current sensing signal.

In another embodiment of the present invention, the adaptive power converter controller has a current sensing unit. The current sensing unit has a fourth resistor serially connected between the load and a grounding end or the load and the output end of the power converter circuit. The voltage level crossing the fourth resistor represents the current sensing signal.

An adaptive constant-voltage control circuit is also provided in the present invention. The adaptive constant-voltage control circuit is electrically coupled to a power converter circuit with an output end coupled to a load. The adaptive constant-voltage control circuit has an adaptive voltage sensing unit and a control unit. The adaptive voltage sensing unit is electrically coupled to the load and generates a voltage sensing signal according to a load current and a load voltage from the load. The control unit receives the above mentioned voltage sensing signal and a reference voltage signal, and controls the operation of the power converter circuit based on the voltage sensing signal and the reference voltage signal.

BRIEF DESCRIPTION OF THE DRAWINGS

The present invention will now be specified with reference to its preferred embodiment illustrated in the drawings, in which.

DETAILED DESCRIPTION OF THE PREFERRED EMBODIMENTS

It is a main feature of the present invention to generate a voltage sensing signal based on both the load voltage and the load current. The voltage sensing signal is then compared with a current sensing signal corresponding solely to the load current. The comparing result is utilized to decide whether the current sensing signal or the voltage sensing signal is used for controlling the power converter circuit to achieve the object of precise constant-voltage to constant-current transferring control. The adaptive power converter controller and the adaptive constant-voltage control circuit of the present invention would be further understood from the figures disclosed below.

Figure 3:
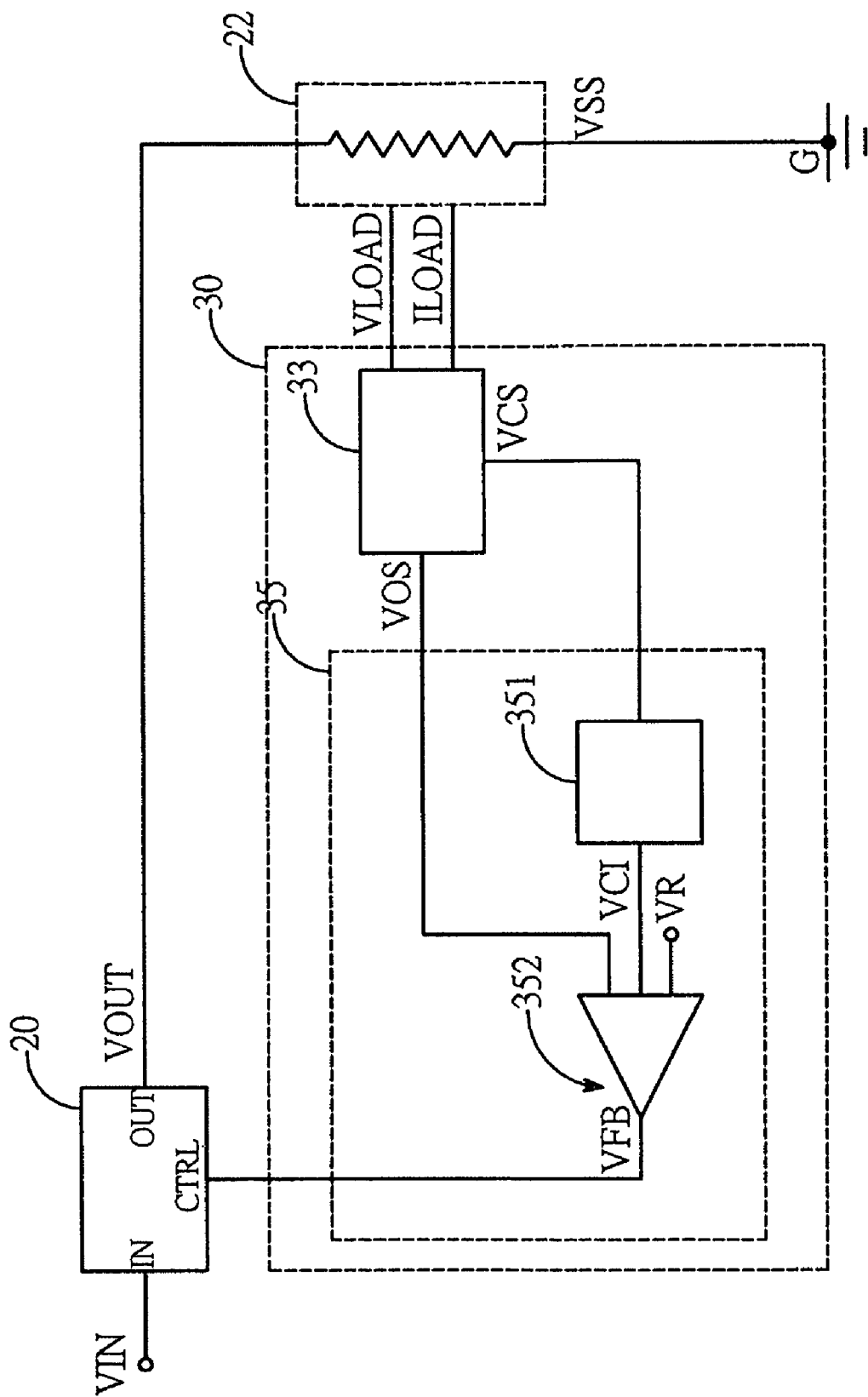
FIG. 3 is a schematic view of a preferred embodiment of the adaptive power converter controller in accordance with the present invention.

FIG. 3 is a circuit diagram showing a preferred embodiment of the adaptive power converter controller in according to the present invention. As shown, the adaptive power converter controller 30 has an adaptive voltage sensing circuit 33 and a converting control circuit 35. The adaptive voltage sensing controller 33 is electrically coupled to a load 22 and generates a voltage sensing signal VOS based on a load current ILOAD and a load voltage VLOAD from the load 22, wherein the load voltage VLOAD is the voltage level crossing the load 22, and the load current ILOAD is the current on the load 22.

The converting control circuit 35 receives the voltage sensing signal VOS and compares the voltage sensing signal VOS with a current sensing signal VCS corresponding solely to the load current ILOAD. Based on the comparing result, the converting control circuit 35 decides whether the current sensing signal VCS or the voltage sensing signal VOS is utilized for generating a feedback voltage signal VFB to control the output power of the power converter circuit 20.

In the present embodiment, the converting control circuit 35 accesses the current sensing signal VCS corresponding to the load current ILOAD through the adaptive voltage sensing circuit 33 directly. The converting control circuit 35 generates at least one feedback voltage signal VFB based on the voltage sensing signal VOS, the current sensing signal VCS, and a reference voltage signal VR. When the voltage level of the current sensing signal VCS is greater than that of the voltage sensing signal VOS, the converting control circuit 35 generates the feedback voltage signal VFB based on the current sensing signal VCS and the reference voltage signal VR.

Whereas, when the voltage level of the current sensing signal VCS is smaller than that of the voltage sensing signal VOS, the converting circuit 35 generates the feedback voltage signal VFB based on the voltage sensing signal VOS and the reference voltage signal VR. Thereby, the object of constant-voltage to constant-current converting control can be achieved.

Moreover, in the present embodiment, the converting control circuit 35 has a voltage level converting circuit 351 and an error amplifier 352. The voltage level converting circuit 351 receives the current sensing signal VCS and adjusts the current sensing signal VCS through a DC level converting operation to output an adjusted current sensing signal VC1. The voltage level converting circuit 351 is utilized to change the voltage level of the current sensing signal VCS so as to adjust the transferring point between constant-voltage mode and constant-current mode.

The error amplifier 352 receives the adjusted current sensing signal VC1, the voltage sensing signal VOS, and a reference voltage signal VR to generate the feedback voltage signal VFB. In detail, when the voltage level of the voltage sensing signal VOS is greater than that of the adjusted current sensing signal VC1, the error amplifier 352 generates the feedback voltage signal VFB based on the voltage sensing signal VOS and the reference voltage signal VR. At this time, the error amplifier 352 adopts voltage feedback control and the power converter controller 30 is in constant-voltage mode. Whereas, when the voltage level of the voltage sensing signal VOS is smaller than that of the adjusted current sensing signal VC1, the error amplifier 352 generates the feedback voltage signal based on the adjusted current sensing signal VC1 and the reference voltage signal VR. At this time, the error amplifier 352 adopts current feedback control and the power converter controller 30 is in constant-current mode. Thus, the object of constant-voltage to constant-current transferring control can be achieved.

Figure 4:
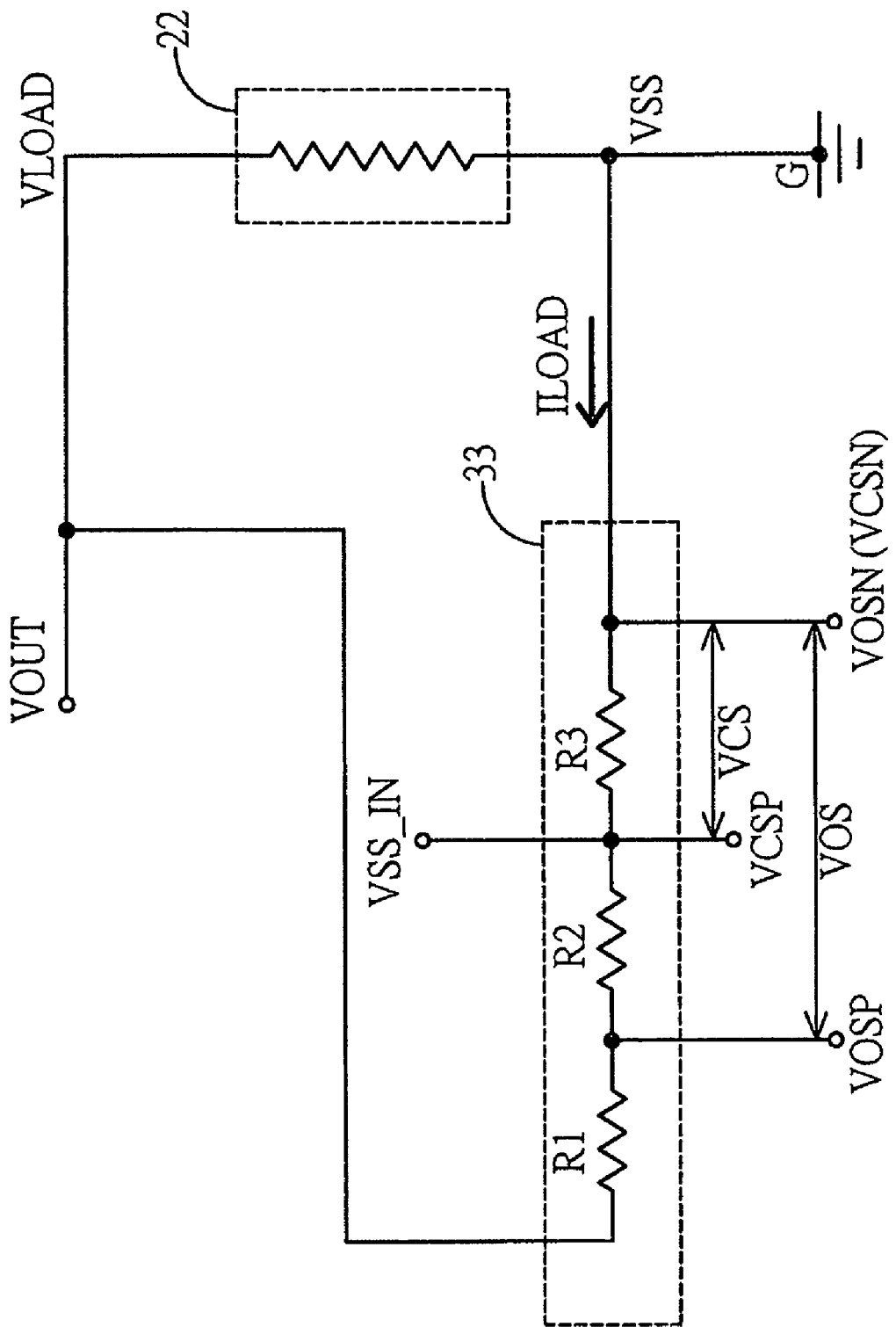
FIG. 4 is a schematic view showing a preferred embodiment of the adaptive voltage sensing circuit in FIG. 3.

FIG. 4 is a circuit diagram showing an embodiment of the adaptive voltage sensing circuit 33 in FIG. 3. As shown, the adaptive voltage sensing circuit 33 has a first resistor R1, a second resistor R2, and a third resistor R3. The three resistors R1, R2, and R3 are connected in a string. The resistor string has one end electrically coupled to an output end OUT of the power converter circuit 20 and the other end electrically coupled to a grounding end G of the load 22 so as to form a circuit loop with the load 22. The grounding end G of the load 22 and the grounding end of the power converter circuit 20 (not shown) may be independent. In the present embodiment, the voltage sensing signal VOS is equal to the sum of voltage levels crossing the second resistor R2 and the third resistor R3. With the voltage dividing ability of the resistor string, voltage level of the voltage sensing signal VOS (VOS=VOSP−VOSN) shows a certain relationship with the load voltage VLOAD and the load current ILOAD, which can be computed by using the following function.

$$(VLOAD - VSS) = \left(1 + \frac{r1}{r2}\right)(VOSP - VOSN) + \left(\frac{r1}{r2}\right)\left(r3 \times ILOAD \times \frac{VLOAD - VSS}{VIN - VSS\_IN}\right) \quad (1)$$

Wherein, r1, r2, and r3 imply the resistance value of the first resistor R1, the second resistor R2, and the third resistor R3 respectively, VIN is the input voltage level of the power converter circuit 20, VOUT is the output voltage level of the power converter circuit 20, VSS_IN is the voltage level of the grounding end of the power converter circuit 20, and VSS is the voltage level of the grounding end of the load 22.

Moreover, referring to FIG. 4, in the present embodiment, the current sensing signal VCS is equal to the voltage level crossing the third resistor R3 of the adaptive voltage sensing circuit 33. The voltage level crossing the third resistor R3 is proportional to the load current ILOAD, which can be computed by using the following function.

$$VCS = r3 \times IIN = r3 \times ILOAD \times \frac{VLOAD - VSS}{VIN - VSS\_IN} \quad (2)$$

Wherein, IIN is the current on the third resistor R3.

The above mentioned functions (1) and (2) are derived in case the power converter circuit 20 operates buck conversion. As shown, the voltage sensing signal VOS is a function of load voltage VLOAD and load current ILOAD, but the current sensing signal VCS is a function of load current ILOAD only. Such relationship among the voltage sensing signal VOS, the current sensing signal VCS, the load voltage VLOAD, and the load current ILOAD is also available in case of boost conversion, buck-boost conversion, and etc. Thus, the idea of the present invention is capable to be applied to power converter circuits of different power conversion models.

Figure 5:
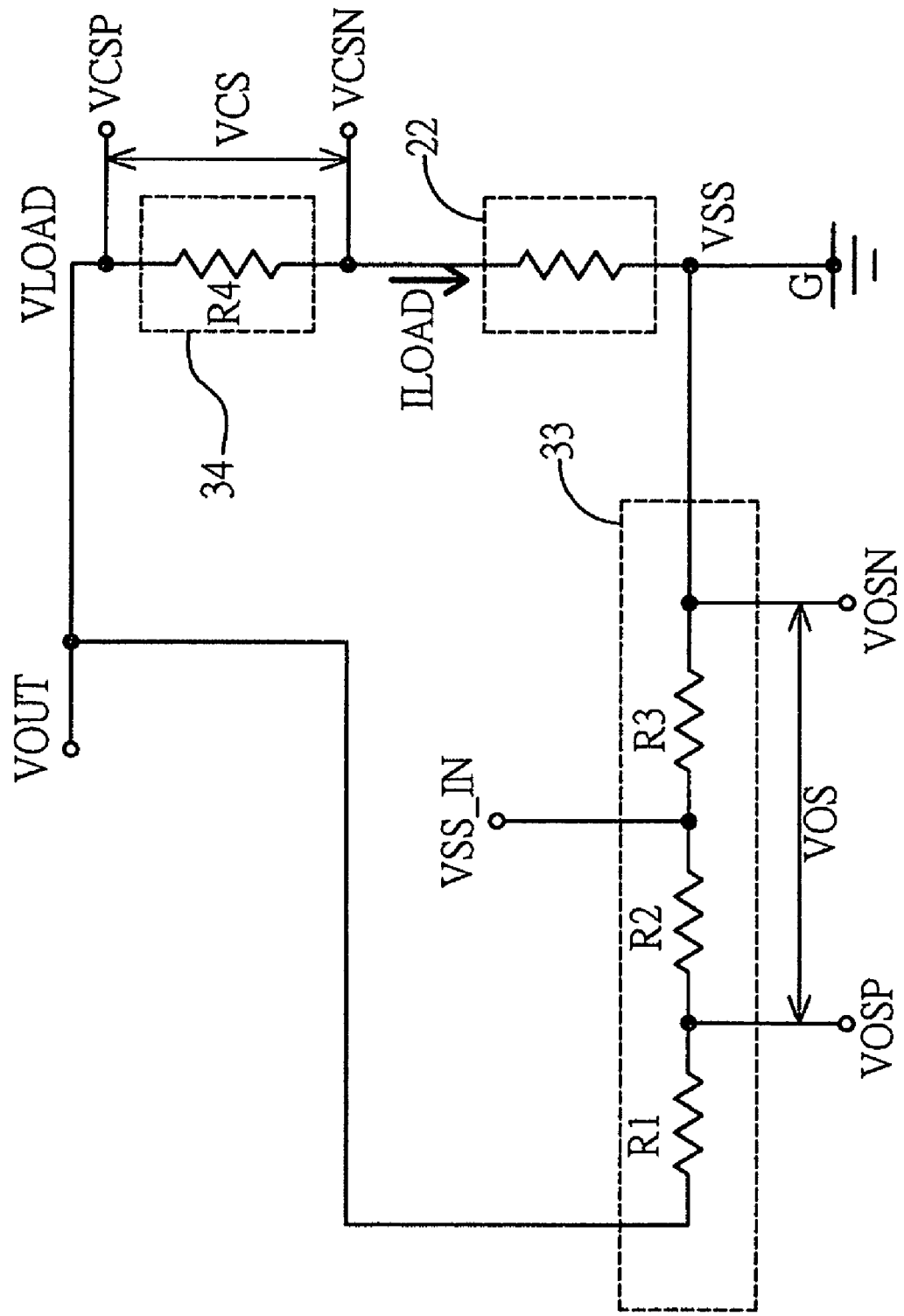
FIG. 5 is a schematic view showing another embodiment of the adaptive power converter circuit in accordance with the present invention.

FIG. 5 shows another preferred embodiment of the adaptive power converter controller 30 in accordance with the present invention. As shown, the adaptive power converter controller 30 has a current sensing circuit 34 other than the voltage sensing circuit 33. The current sensing circuit 34 has a fourth resistor R4 serially connected between the output end OUTPUT of the power converter circuit 20 and the load 22. That is, the load current ILOAD flows to the load 22 through the current sensing circuit 34 first. The current sensing signal VCS is the voltage level crossing the fourth resistor R4. The relationship between the current sensing signal VCS and the load current ILOAD shows the function: VCS=r4×ILOAD. Wherein, r4 is resistance of the fourth resistor R4. In practice, as the voltage level of the current sensing signal VCS is concerned, the current sensing circuit 34 can be serially connected between the load 22 and the grounding end G to have the load current ILOAD reaching the current sensing circuit 34 after passing through the load 22 to prevent the voltage level of the current sensing signal VCS exceeding the operable range of the converting control circuit 35.

Figure 1:
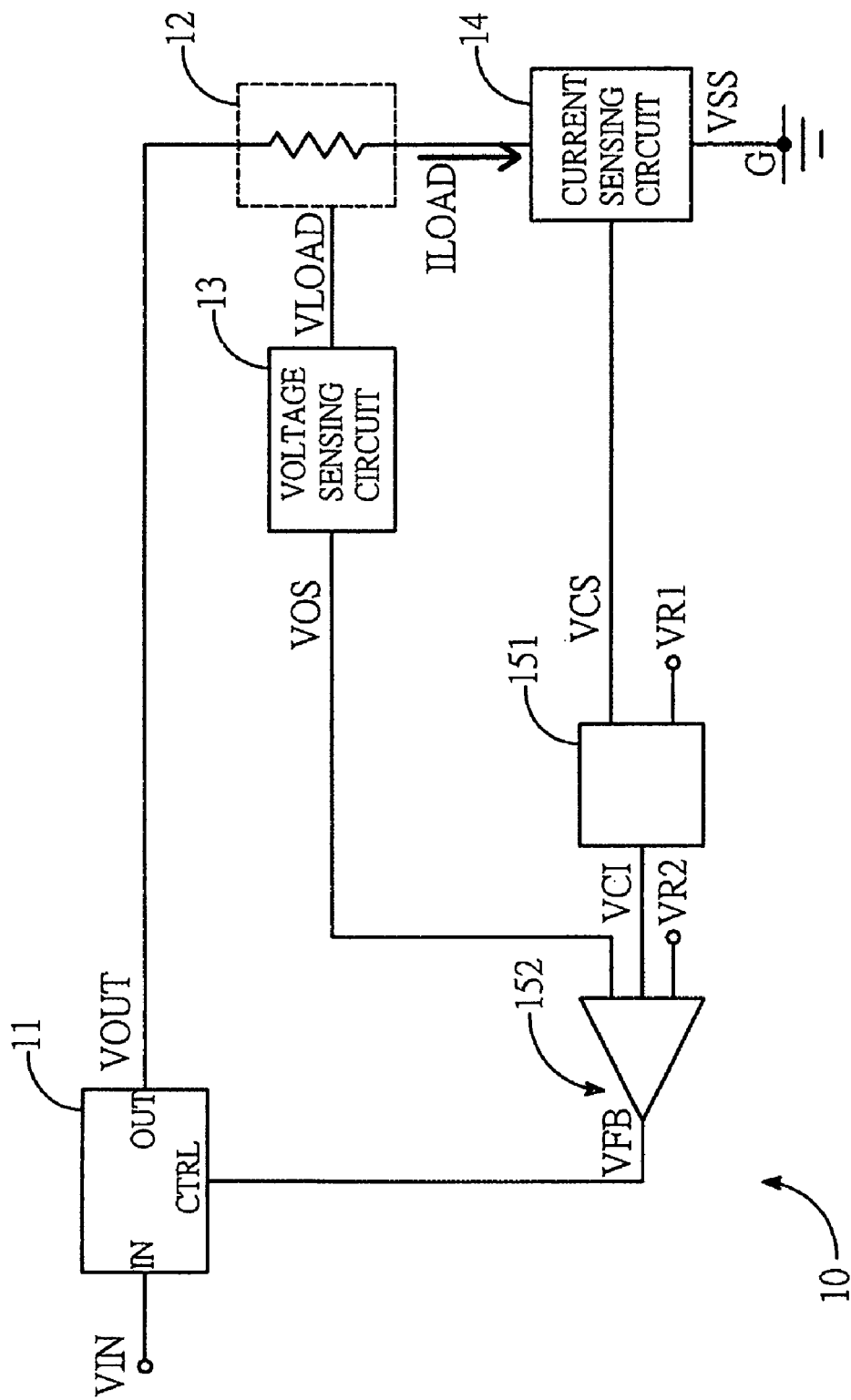
FIG. 1 is a schematic view of a prior art constant-voltage to constant-current transferring controller.
Figure 2:
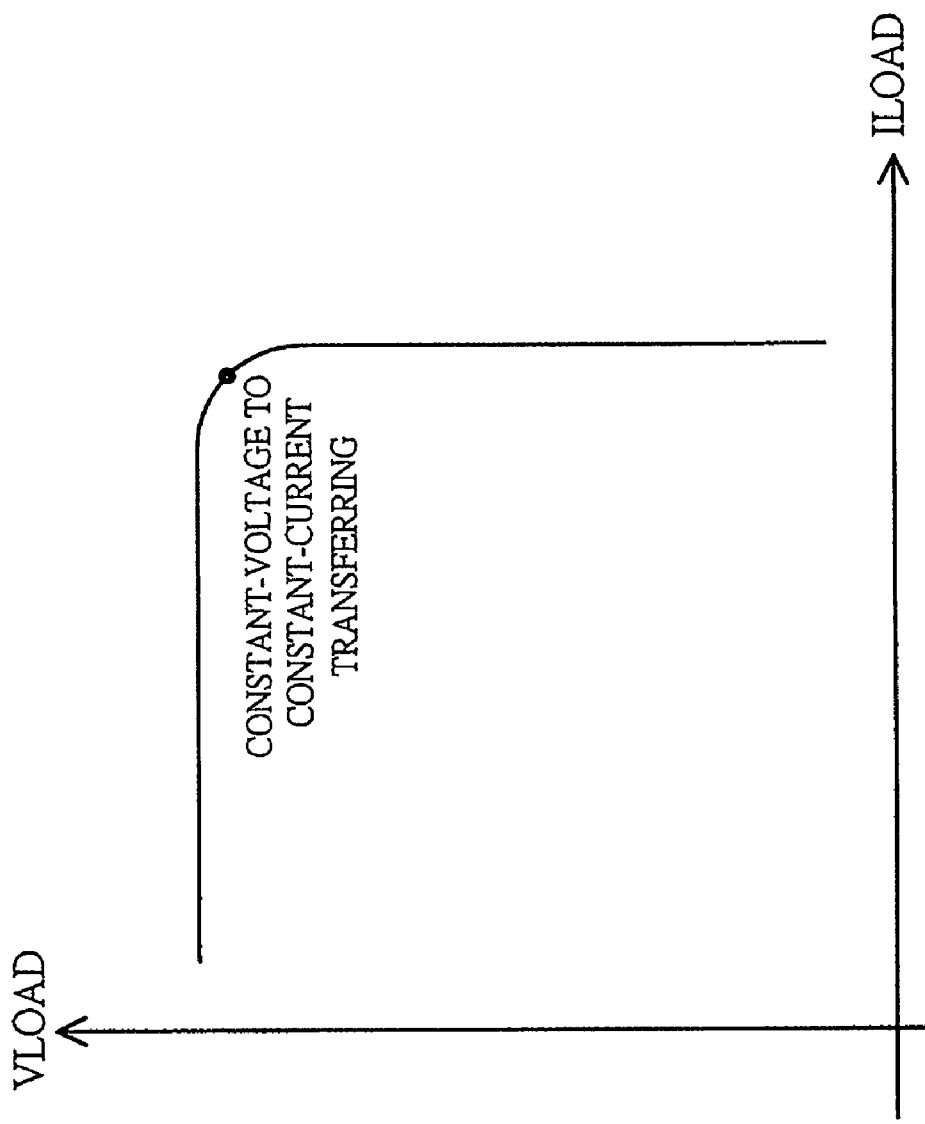
FIG. 2 is a diagram showing a relationship between output voltage and output current of the power converter circuit controlled by the constant-voltage to constant-current transferring controller in FIG. 1.
Figure 6:
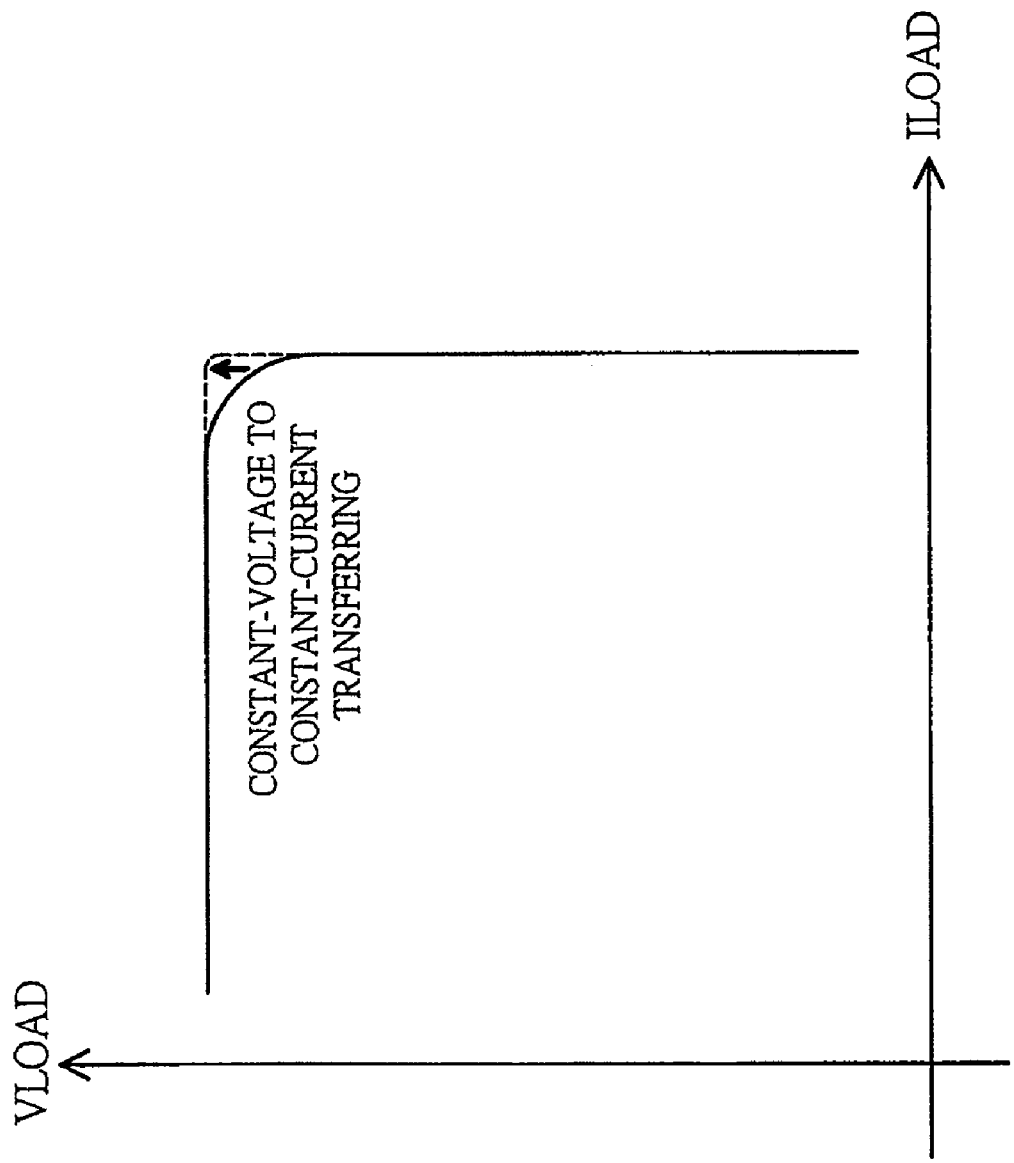
FIG. 6 is a diagram showing a relationship between output voltage and output current of the power converter circuit controlled by using the adaptive power converter controller.

FIG. 6 is a diagram showing a relationship between the output voltage and the output current of the power converter circuit 20 when the adaptive power converter controller 30 is used to proceed constant-voltage to constant-current transferring. Since the voltage sensing signal VOS is generated based on the load voltage VLOAD and the load current ILOAD. Thus, the voltage sensing signal VOS might be depressed by the increasing of the load current ILOAD under constant-voltage mode. At this time, the feedback voltage signal VFB from the error amplifier 352 shows a tendency of increasing output voltage VOUT so as to overcome the problem shown in FIG. 2 that the efficiency of constant-voltage feedback control being disturbed by constant-current feedback control when the output current close to the predetermined current limit of the constant-current mode. Moreover, as shown in FIG. 3, in practice, a cable might be used for transmitting electric power from the power converter circuit 20 to the load 22. Also refer to FIG. 4, the resistance of third resistor R3, which is coupled between the grounding end G of the load 22 and the grounding end of the power converter circuit 20 (not shown), is proportional to the resistance on the cable. Thus, voltage drop on the cable during power transmission can be compensated by selecting a suitable third resistor R3 or adjusting the resistance of the third resistor R3 so as to generate a precise load voltage VLOAD on the load 22.

Figure 7A:
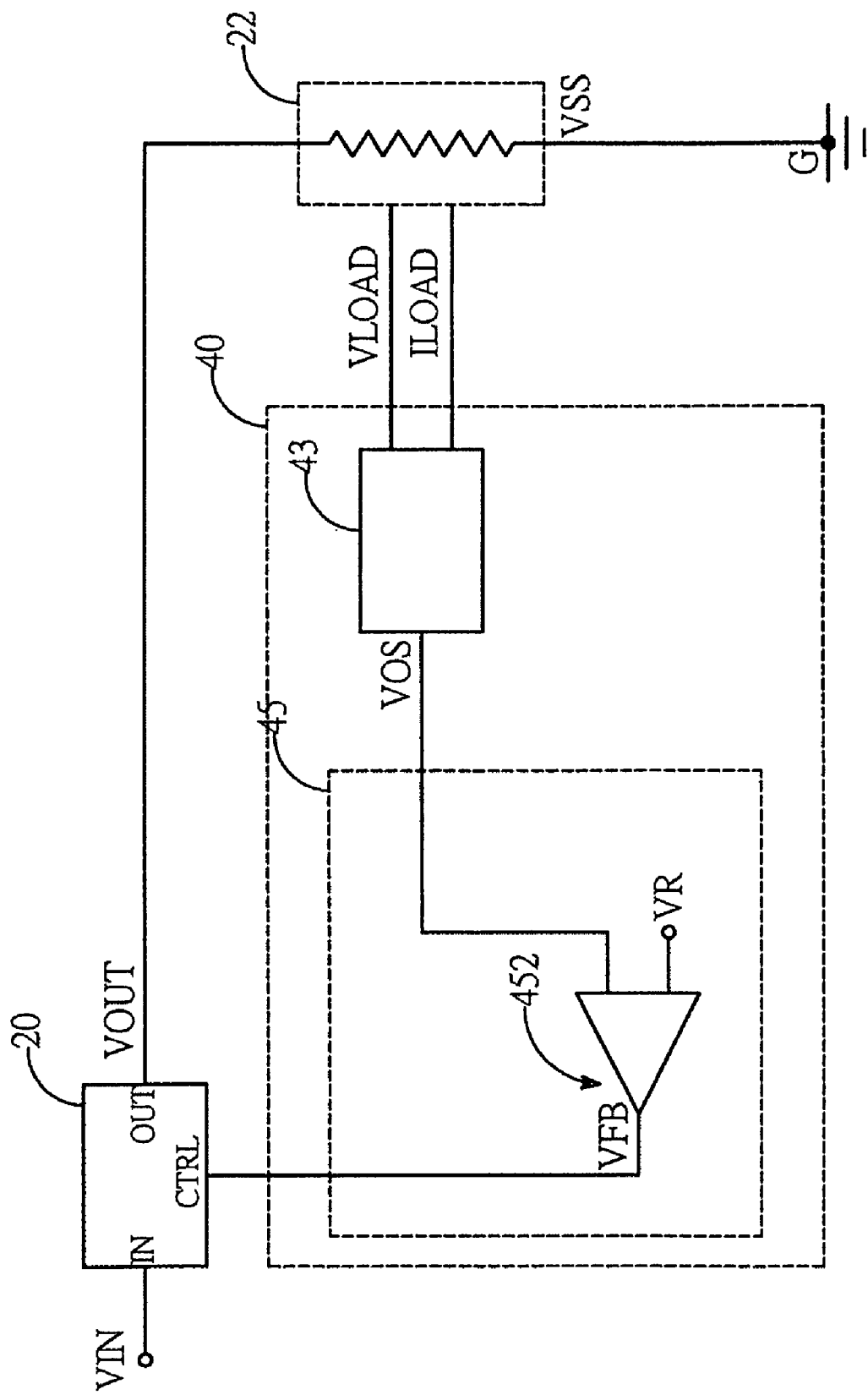
FIGS. 7a and 7b are schematic views showing a preferred embodiment of the adaptive constant-voltage control circuit in accordance with the present invention.
Figure 7B:
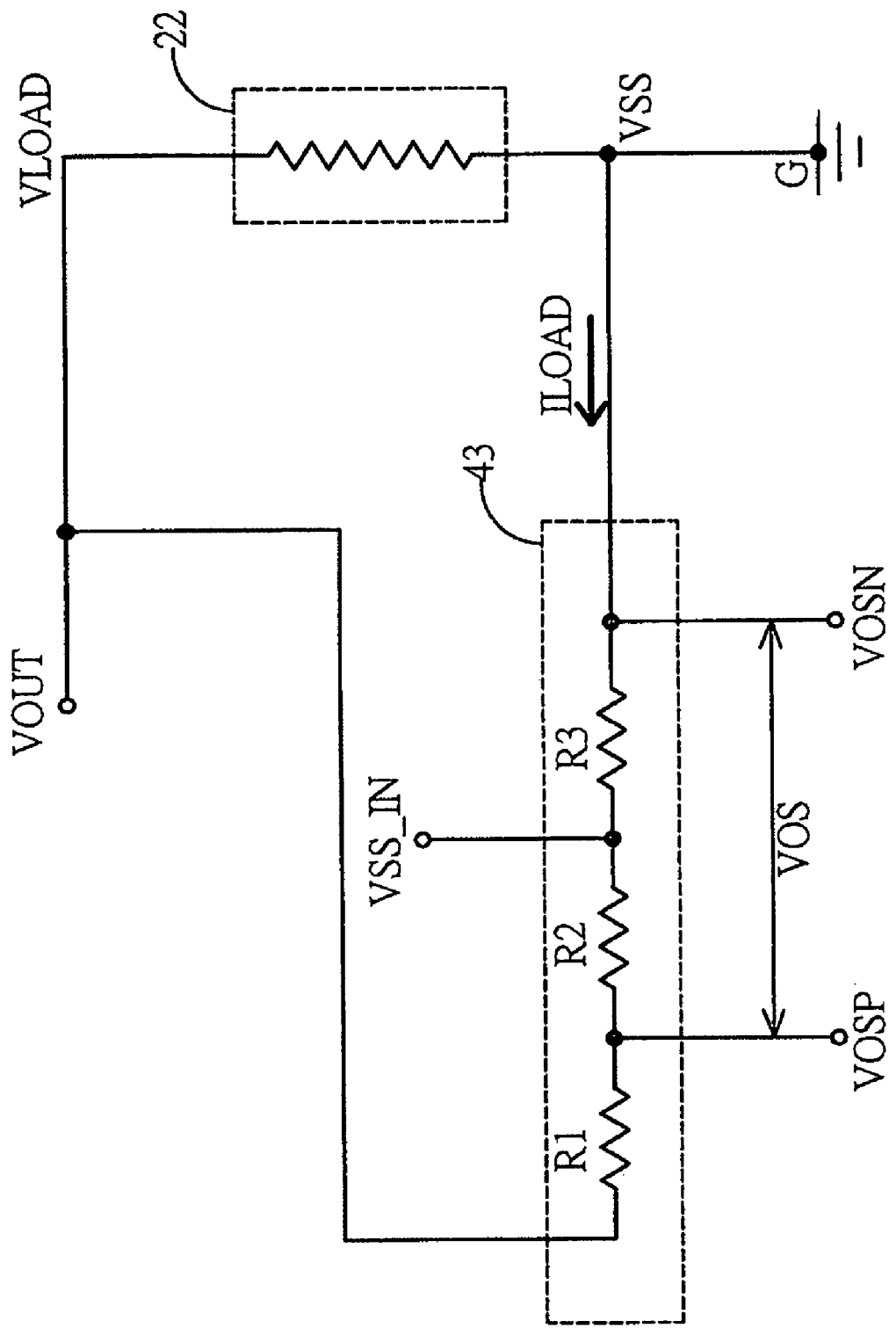

FIGS. 7a and 7b are schematic views showing a preferred embodiment of an adaptive constant-voltage control circuit 40 in accordance with the present invention. As shown, the adaptive constant-voltage control circuit 40 is coupled to a power converter circuit 20. The output end OUT of the power converter circuit 20 is coupled to a load 22. The adaptive constant-voltage control circuit has an adaptive voltage sensing unit 43 and a control unit 45. The adaptive voltage sensing unit 43 is coupled to the load 22 and generates a voltage sensing signal VOS based on a load current ILOAD and a load voltage VLOAD from the load 22. The voltage sensing signal VOS is utilized for feedback controlling the output voltage VOUT of the power converter circuit 20. The control unit 45 has an error amplifier 452. The control unit 45 receives the voltage sensing signal VOS and a reference voltage signal VR, and output at least one feedback voltage signal VFB to the power converter circuit 20 based on the voltage sensing signal VOS and the reference voltage signal VR.

While the preferred embodiments of the present invention have been set forth for the purpose of disclosure, modifications of the disclosed embodiments of the present invention as well as other embodiments thereof may occur to those skilled in the art. Accordingly, the appended claims are intended to cover all embodiments which do not depart from the spirit and scope of the present invention.

What is claimed is:

1. An adaptive power converter controller, which is electrically coupled to a load and a power converter circuit, comprising:

an adaptive voltage sensing unit, generates a voltage sensing signal according to a load current and a load voltage from the load; and a converting control circuit, receiving the voltage sensing signal and making a decision of controlling the power converter circuit according to a current sensing signal corresponding solely to the load current or the voltage sensing signal by comparing the voltage sensing signal with the current sensing signal.

2. The adaptive power converter controller of claim 1, wherein the adaptive voltage sensing unit has a first resistor, a second resistor, and a third resistor composing a resistor string forming a circuit loop with the load, and the resistor string has one end electrically coupled to an output end of the power converter circuit and the other end electrically coupled to a grounding end of the load.

3. The adaptive power converter controller of claim 2, wherein sum of voltage levels crossing the second resistor and the third resistor represents the voltage sensing signal.

4. The adaptive power converter controller of claim 2, wherein voltage level crossing the third resistor represents the current sensing signal.

5. The adaptive power converter controller of claim 4, wherein the voltage level crossing the third resistor is proportional to the load current.

6. The adaptive power converter controller of claim 2, wherein one end of the first resistor is electrically connected to the output end of the power converter circuit and the other end of the first resistor is electrically connected to the second resistor.

7. The adaptive power converter controller of claim 2, wherein a conjunction of the second resistor and the third resistor is electrically connected to a grounding end of the power converter circuit, and the third resistor is electrically connected to the grounding end of the load.

8. The adaptive power converter controller of claim 1, wherein the converting control circuit has a level converting circuit for adjusting voltage level of the current sensing signal, and the converting control circuit compares voltage level of the adjusted current sensing signal and that of the voltage sensing signal.

9. The adaptive power converter controller of claim 1, further comprising a current sensing unit, which has a fourth resistor serially connected between the load and a grounding end.

10. The adaptive power converter controller of claim 1, further comprising a current sensing unit, which has a fourth resistor serially connected between the output end of the power converter circuit and the load.

11. An adaptive constant-voltage control circuit, which is electrically coupled to a power converter circuit with an output end thereof coupled to a load, comprising:

an adaptive voltage sensing unit, coupled to the load and generate a voltage sensing signal according to a load current and a load voltage from the load; and a control unit, receiving the voltage sensing signal and a reference voltage signal to control output of the power converter circuit.

12. The adaptive constant-voltage control circuit of claim 11, wherein the adaptive voltage sensing unit has a first resistor, a second resistor, and a third resistor composing a resistor string with both ends thereof electrically connected to the output end of the power converter circuit and a grounding end of the load, the voltage sensing signal is corresponding to sum of voltage levels crossing the second resistor and the third resistor, and a conjunction between the second resistor and the third resistor is electrically connected to a grounding end of the power converter circuit.

13. The adaptive constant-voltage control circuit of claim 12, wherein voltage level crossing the third resistor is proportional to the load current.

* * * * *